United States Patent [19]

Schmitz

[11] Patent Number: 5,759,141

[45] Date of Patent: Jun. 2, 1998

[54] CALENDER ROLLER

[75] Inventor: Christian Wimmar Schmitz, Kempen, Germany

[73] Assignee: Voith Sulzer Finishing GmbH, Krefeld, Germany

[21] Appl. No.: 618,963

[22] Filed: Mar. 20, 1996

[30] Foreign Application Priority Data

Mar. 29, 1995 [DE] Germany ............ 195 11 481.7
Sep. 13, 1995 [DE] Germany ............ 195 33 823.5

[51] Int. Cl.$^6$ ............................................ B23P 15/00
[52] U.S. Cl. ............................................ 492/39; 492/40
[58] Field of Search ............ 492/49, 39, 40, 492/53

[56] References Cited

U.S. PATENT DOCUMENTS

| | | |
|---|---|---|
| 3,590,453 | 7/1971 | Bryand. |
| 3,711,913 | 1/1973 | Galeone et al. |
| 3,907,232 | 9/1975 | Odermatt. |
| 5,097,596 | 3/1992 | Hoogesteger et al. |
| 5,387,451 | 2/1995 | Miller. |

FOREIGN PATENT DOCUMENTS

| | | |
|---|---|---|
| A-0 462 434 | 12/1991 | European Pat. Off. |
| 2129646 | 10/1972 | France. |
| 2617211 | 12/1988 | France. |
| 1101940 | 3/1961 | Germany. |
| 1280035 | 10/1968 | Germany. |
| 23 42 421 C3 | 3/1974 | Germany. |
| 26 23 939 | 12/1976 | Germany. |
| 32 28 607 A1 | 2/1984 | Germany. |
| 38 20 050 | 1/1989 | Germany. |
| 38 20 050 A1 | 1/1989 | Germany. |
| 42 19 989 A1 | 12/1993 | Germany. |
| 44 26 007 A1 | 1/1996 | Germany. |
| 44-16632 | 7/1969 | Japan. |
| 48-11281 | 4/1973 | Japan. |
| 57-32246 | 7/1982 | Japan. |
| 62-23897 | 2/1987 | Japan. |
| 2-62637 | 12/1990 | Japan. |
| 2 040 020 | 8/1980 | United Kingdom. |
| 2 061 455 | 5/1981 | United Kingdom. |

OTHER PUBLICATIONS

"Das Papier", vol. 10A, 1992, pp. V182 to V188, elastic roller coatings for super calenders and soft calenders.
Das Papier, vol. 10A, 1992, pp.V18sff.

*Primary Examiner*—Irene Cuda
*Attorney, Agent, or Firm*—Darby & Darby

[57] ABSTRACT

A calender roller has a cylindrical base body and a covering made of a flexible plastic material. The covering has an inside diameter that is greater than an outside diameter of the base body to define an intermediate annular space therebetween. A support structure is disposed in the intermediate space to transmit load forces from the covering to the base body.

33 Claims, 4 Drawing Sheets

CALENDER ROLLER

BACKGROUND OF THE INVENTION

1. Field of the Invention

The present invention relates to a calender roller having a cylindrical base body. More specifically, the present invention relates to a calender roller having a cylindrical base body, a covering and capping elements disposed at the axial ends of the base body.

2. Discussion of the Related Art

Rollers for use in calenders have been known for many decades. The roller typically has a covering, which includes a relatively thick layer of fibrous material. These rollers include a plurality of ring-shaped round blanks that are made of fibrous material. The center holes of the round blanks are punched out. Thereafter, the round blanks are placed about the base body. The stack of round blanks is held in place by capping elements which compress the round blanks in the axial direction. The covering is then machined on a lathe so that it has a smooth outer cylindrical shape.

Fibrous material is sensitive to marking. Therefore, the roller must be disassembled from time to time, turned down on a lathe to create a new smooth outer cylindrical surface, and then reassembled. Accordingly, the diameter of the roller decreases each time it is machined on a lathe (i.e., turned down).

Coverings made of a flexible plastic material are also known. These coverings have an outer jacket having a relatively thin wall thickness. The covering is placed about an appropriately dimensioned base body. The jacket is fixedly held to the base body by being shrink fit onto the base body. The base body of such a roller has a larger diameter than a roller having a covering made of fibrous material. Further, these types of rollers do not require any capping elements.

The overall design of the two types of rollers is very different. If rollers with fibrous material coverings as well as rollers with plastic coverings are used in a single manufacturing operation, then two types of spare rollers are needed.

SUMMARY OF THE INVENTION

It is an object of the present invention to provide a calender roller that can be equipped with either a fibrous material covering or with a plastic covering so that only one type of spare roller is necessary.

In accordance with a preferred embodiment demonstrating further objects, features and advantages of the present invention, the covering is made of plastic and has an inside diameter that is greater than the outside diameter of the base body so as to define an intermediate space between the base body and the covering. A hollow cylindrical support structure, which transmits load forces from the covering to the base body, is disposed in the intermediate space.

The hollow cylindrical support structure provides an area of support to the plastic covering that is of a larger diameter than the base body. Therefore, it is possible to use a plastic covering which is substantially thinner than a conventional covering made of a fibrous material, while the roller has approximately the same outside diameter. Capping elements can be used to hold the support structure in place. The jacket shaped plastic covering can be placed on the support structure either before or after the support structure has been installed on the calender roller. The plastic covering can be placed on the outside diameter of the support structure after the support structure has been installed in the calender roller because the support structure has a slightly greater outside diameter than that of the capping elements. Therefore, the plastic covering can be slipped over the capping elements as it is being placed on the support structure.

An advantage of the roller according to the present invention is that only one type of spare roller is required to be maintained, even if both rollers with fibrous material coverings and rollers with plastic coverings are used in the same factory. Additionally, rollers which conventionally have been provided with fibrous material coverings can now be provided with modern plastic coverings with little effort.

The radial thickness of the support structure is preferably about 30 to 100 percent of the radius of the base body. Therefore, the thickness of the support structure is not insignificant. The lower limit range permits the rollers to have a diameter which is smaller than that of a conventional roller having a fibrous material covering and therefore leads to a corresponding weight savings. The upper limit range permits the use of a thin wall plastic covering. Additionally, approaching the upper limit range permits the support structure to bridge the intermediate space between the plastic covering and the base body.

The specific gravity of the support structure is substantially less than the specific gravity of the base body. Reducing the weight of the roller is important, especially for a calender having a roller stack, because the line load in each of the working nips increases from the top to the bottom due to the weight of the rollers that are disposed above each respective working nip. Therefore, the use of lighter rollers makes it possible to work with a relatively higher line load in the upper working nips without exceeding the line load limit in the lowest working nip. Steel, which has a specific gravity of about 7.8 kg/dm$^3$, is typically used as the material for the base body. The support structure has an average specific gravity of less than 3.5 kg/dm$^3$, and preferably less than 1.5 kg/dm$^3$. Therefore, the weight of the roller according to the present invention is of the same order of magnitude or less than a conventional calender roller having a fibrous material covering.

The support structure is preferably made of thin wall cellular material, which provides a very light, but stiff support structure. The cells of the cellular material are substantially completely closed. The cells provide great strength despite the use of very thin wall thicknesses to form the cells. Therefore, the calender roller according to the present invention has a lower weight than a conventional calender roller having a fibrous material covering.

At least a portion of the walls that form the cells extend in an approximately radial direction. The support structure is able to absorb the forces that arise during the operation of the calender roller. This is especially true for radial forces, which are transmitted by the walls and are applied in an approximately radial direction.

The support structure preferably has a large number of individual elements which are fixedly connected to each other. Because the elements are divided up into a plurality of individual elements, it is possible to vary, from one element to the next, the direction in which side walls extend. Therefore, the support structure is especially well adapted to absorb forces that arise during calendering operation.

The present invention permits the cells to be smaller and, therefore, stiffer. The elements are preferably a plurality of round blanks each having a central hole. Each of the cells is disposed between two end walls which extend in radial planes. The end walls are held at a distance from one another by the cells and absorb the radial forces that act on a calender roller. The side walls of the cells also absorb radial forces. Tensile and compressive forces, which act in an axial direction of the roller, are absorbed by the circumferential wall, and by the components of the side walls of the cells which extend in the axial direction. Tensile compressive forces can also be absorbed by additional interior walls that are concentric to the circumferential wall.

The cells of the individual elements preferably extend parallel to each other and to the end walls. Adjacent round blanks are offset at an angle with respect to each other so that the directions of the cells are offset at the same angle with respect to each other. In other words, the cells of one element extend in a direction that is disposed at a predetermined angle with respect to the direction that the cells of the adjacent element extend. The use of the angular offset in the elements provides essentially uniform results in the roller's ability to absorb radial forces over the circumference of the roller.

In another embodiment, the side walls of the cells of the individual elements extend perpendicularly with respect to the end walls to provide an especially good stiffening effect on the round blanks' axial end walls. The end walls are held at a distance from each other by the side walls of the cells.

In another preferred embodiment, the support structure is formed by at least one cylindrical (i.e., annular) layer that is disposed between the roller axle and the circumferential wall. The layer is made of individual elements, circumferentially adjacent elements of which are offset in the axial direction. Each element is formed by the cell's side walls, which extend in an approximately radial direction. Therefore, the cells, or more specifically, their side walls, absorb the entire radial loading of the calender roller. The position of the side walls can be matched to any particular circumferential region as is required because of the division of the layer into individual elements. Compressive and tensile forces can be absorbed by the circumferential wall, by additional walls that are concentric to the circumferential wall and by the axial components of the cells' side walls.

The individual elements, which are adjacent to each other in the circumferential direction, are preferably offset from each other in the axial direction. Therefore, problem locations, which could otherwise arise from the individual elements bumping into each other, are eliminated.

The cells preferably have a honeycomb-like shape which, in combination with the adjacent cells and the covering at the ends of the cells, creates an extraordinarily stiff body. Such a honeycomb material is easy to manufacture because it can be comprised of webs which are alternately combined with adjacent webs.

The support structure is preferably formed by at least one cylindrical layer formed from a web of honeycomb material. In honeycomb webs, the cells are formed from stiff bonded double walls which alternate with single cell walls. The single cell walls are, to a predetermined extent, movable and thus permit the web of honeycomb material to be formed. In other words, the material is first formed flat and the strips of the fibrous material are bonded to each other in the area of the double bonded walls. After bonding, the strips are pulled apart to automatically form the shape of a cylinder or partial cylinder. Thus, an extraordinarily large number of closely spaced adjacent cell walls, which extend radially, are formed. Many of these radially extending cell walls are double bonded walls, which have an increased stiffness.

The cylindrically formed web of honeycomb material is preferably provided with a cylindrical cover wall on at least one side. The cover wall substantially increases the stiffness of the honeycomb. If the cover wall has been bonded to the flat, unformed web of honeycomb material, the outside shape of the individual honeycombs is predetermined when the cylinder is later formed.

In one embodiment of the present invention, the cellular material has a hexagonal cross-section, which, in combination with the adjacent cells and the covering at the ends of the cells, creates an extraordinarily stiff formed body. Such a hexagonal honeycomb material is easy to manufacture because it can be comprised of webs which are alternately combined with first one adjacent web and then another oppositely disposed adjacent web.

The cellular material may also have a rectangular honeycomb-like shape. The distance between the stiffer double walls is somewhat increased in a rectangular honeycomb than in a hexagonal honeycomb and the distance between the less stiff, single walls is decreased. A rectangular honeycomb creates a support structure having support properties which are distributed approximately the same in the circumferential and axial directions. Therefore, rectangular honeycombs are even better suited than hexagonal honeycombs for layers that are formed into cylindrical shapes.

Alternatively, the cells may have a corrugated cardboard-like shape. This shape also provides sufficient stiffness and is inexpensive to manufacture.

The plastic is preferably made of a fiber-reinforced plastic. If carbon fibers are used, very high stiffness results together with the lowest possible weight. The plastic is preferably an aramid material. In practice, however, other materials, such as paper, cardboard or sheet metal, for example, aluminum sheet, may be used as the cell material. The walls can be connected to one another and to the cover walls, end walls and the circumferential wall by various methods, such as bonding, welding, soldering and the like, depending upon the material that is being used.

The cells are preferably filled with a curable filler material that, after pouring, hardens within the cells. The filled cells are used to improve the compressive strength of the support structure, especially if higher demands (e.g., higher forces) are placed on the support structure. Relatively light weight filler materials are sufficient to increase the compressive strength of the support structure. The weight of the roller, including the filler material, is less than the weight of a conventional roller that has a fibrous material covering.

The filler material is preferably a curable plastic. The filler material can easily be poured into the cell cavities, and thereafter harden (i.e., cure) in place. The roller can preferably withstand at least a compressive stress of more than $20N/mm^2$, which is typically applied in supercalenders. However, the roller can more preferably withstand a compressive stress of more than $43N/mm^2$ because it is desirable to use the rollers in calenders having a lower number of working nips than a supercalender. The curable plastic can be, for example, an epoxy resin. By way of example, a support structure made with an epoxy resin was stable up to a compressive stress of $80N/mm^2$.

In accordance with an additional embodiment of the present invention, the support structure can be comprised of, at least in part, light weight metals, such as, aluminum and magnesium and their respective alloys. It is possible to manufacture a support structure having adequate support properties and low weight with the use of these light weight metals. In an alternative embodiment, the support structure can be comprised of, at least in part, wood, such as balsa wood. Alternatively, the support structure may be comprised of, at least in part, a fibrous material. In all of these embodiments, the support structure is preferably formed of round blanks which can easily be manufactured and clamped in place between the capping elements.

The round blanks are preferably placed on the base body in an alternating fashion, so that, for example, round blanks made of wood and light metal, are placed next to each other. In another embodiment, round blanks made of aluminum and cellular material are placed next to each other. In this embodiment, the round aluminum blanks absorb the radial forces, and the walls of the cellular material, which preferably extend axially, prevent the round aluminum blanks from bulging.

Round wooden blanks are preferably assembled from arc segments. The arc segment preferably have fibers that are aligned in a radial direction. Therefore, any irregularities in the fibrous material, which would otherwise appear on the surface of the treated web of material after the web of material passes through the working gap, are avoided because the fibers do not extend in the circumferential direction.

The round wooden blanks are preferably formed from at least two rings. Each ring is preferably assembled from arc segments whose fibers are aligned radially.

The support structure is preferably comprised of, at least in part, a fibrous material covering so that it may be turned down on a lathe. Therefore, conventional rollers having fibrous material coverings can be converted, in a relatively simple manner, into rollers having a plastic covering.

In all of the embodiments, the support structure has a thin wall continuous tube disposed on the outside. A continuous tube does not have any seams, which results in a smooth, cylindrical surface. In addition, the support structure can be installed onto the circumferential wall under prestress, to increase the stiffness of the roller.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
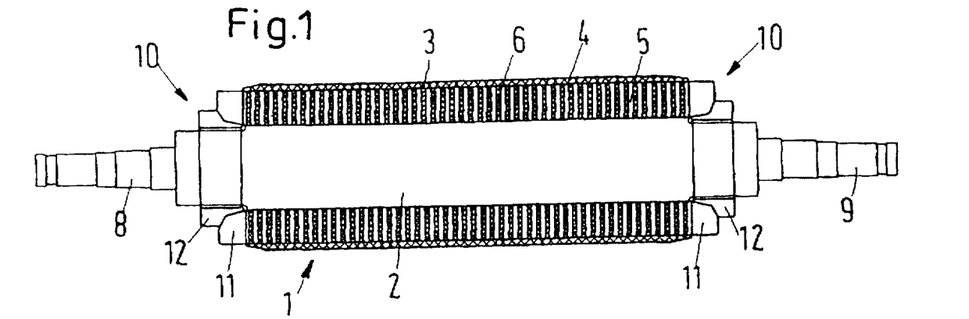
FIG. 1 is a partial cross-sectional view of a calender roller in accordance with the present invention.

Referring now to FIG. 1, a roller 1 for use in a calender is illustrated. Roller 1 includes a base body 2 and a covering 3, which is made of flexible plastic, for example, silicone rubber or epoxy resin. The inside diameter of the covering 3 is substantially larger than the outside diameter of the base body 2 and defines an intermediate space therebetween. A support structure 5, which has an outer circumferential wall 4, is disposed in the intermediate space. Circumferential wall 4 is preferably a cylindrical tube that is bonded to the support structure 5. Support structure 5 is stiff enough so that it is able to securely carry the flexible covering 3 and transmit to the base body 2 all of the forces that are exerted on the calender roller 1.

Support structure 5 is comprised of a number of individual elements 6, in the form of ring-shaped round blanks, which each have a large central hole 7. The base body 2 is placed through the holes 7 of elements 6. Bearing journals 8 and 9 and capping elements 10 are disposed at the axial ends of the base body 2. Each of the capping elements 10 includes a pressure plate 11, which can be moved radially with the aid of an adjusting nut 12. In the illustrated embodiment, capping elements 10 hold the support structure 5 in place. One can, however, replace the support structure 5 and the flexible covering 3 with a thick covering made of a fibrous material. In this embodiment, the pressure plates 11 can be used to hold a stack of round fibrous material blanks under high axial compression. Bonding between the support structure 5 and the base body 2 is not required if the capping elements 10 are being used.

Figures 2, 3, 4, 5, 6:
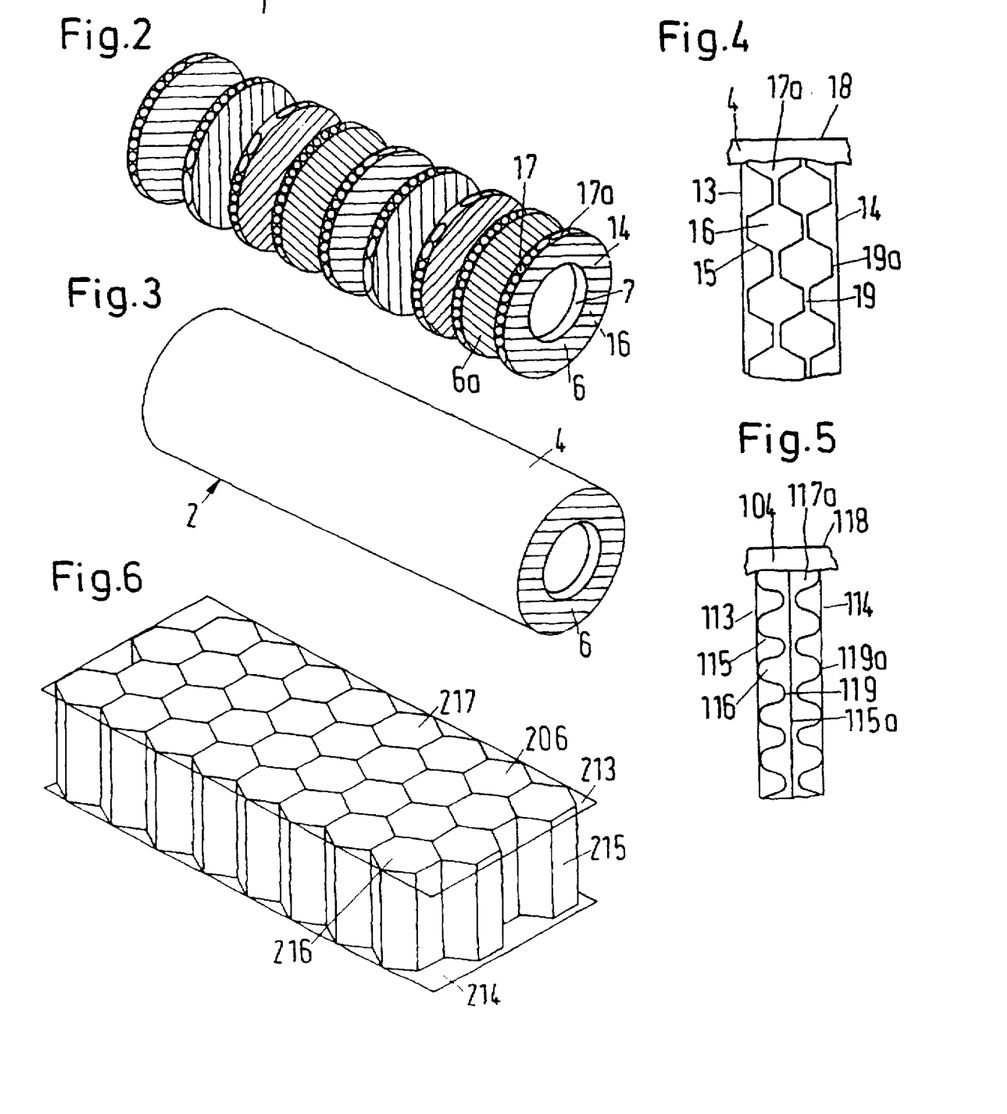
FIG. 2. shows a plurality of round blanks from which the support structure of the base body is made.
FIG. 3 shows a perspective view of a support structure.
FIG. 4 is a partial cross-sectional view of a round blank.
FIG. 5 is a partial cross-sectional view of another embodiment of a round blank.
FIG. 6 is a segment of a round blank according to yet another embodiment of the present invention.

Referring now to FIGS. 2–4, each round blank 6 has two end walls 13, 14. Side walls 15 are disposed between the two end walls 13, 14. Cells 16 are defined by the side walls 15. Cells 16, for each round blank, all extend in the same direction, as can be seen in FIG. 2. The center cell 16 that would extend through a center of the round blank if not for the center hole 7, extends in a radial direction, and the remaining cells of the round blank all extend in a direction that is parallel to the center cell. Therefore, the remaining cells effectively form parallel chords of the circular round blank.

The ends 17 of the cells 16 are bonded to a cover wall 18. In a preferred embodiment, the cover wall 18 is formed by the circumferential wall 4. Because the circumferential wall 4 surrounds the round blank 6 in a cylindrical fashion, at end 17 (whose cell extends closer to the center), a relatively small surface area is covered by wall 4, while at end 17a (whose cell extends further away from the center), a relatively large surface area of the cell 16 is covered (see FIG. 2). A larger surface area of end 17a is covered because of the inclined position of its respective cell end relative to wall 18. Cells 16 extend parallel with respect to each other and to the end walls 13, 14.

Adjacent round blanks 6 and 6a are offset at an angle with respect to one another so that the directions of their respective cells 16 are offset at the same angle with respect to each other. As illustrated in FIG. 2, as a result of a uniform angular offset, the effect of the positioning of the cells can be distributed evenly. The end walls of the individual round blanks, which lie against each other, are bonded to each other. During operation, the radial loading is absorbed by the end walls 13 and 14. The radial loading is also absorbed, in part, by the side walls 15 of the cells 16. Compressive or tensile forces that are acting in the axial direction are absorbed by the components of the side walls 15 which extend in the axial direction.

As FIG. 4 schematically shows, the side walls 15 are manufactured from trapezoidally formed webs which form a bonded joint 19 or 19a at every place where they lie against an adjacent side or end wall, respectively.

While FIG. 4 shows a honeycomb-like cellular material, FIG. 5 shows a corrugated cardboard-like cellular material. Reference numbers have been increased by 100 in FIG. 5 from like reference numbers in FIGS. 1–4 with like elements. In essence, the difference between FIG. 4 and FIG. 5 is that the side walls 115 are shaped in a wavelike manner, not trapezoidally as are side walls 15. In addition, a side wall 115a, which is parallel to the end walls 113, 114, is disposed between the side walls 115. Of course, numerous other differences in the cross-sectional shape of the cellular material are possible. For example, the cells can have a square cross-sectional shape.

FIG. 6 illustrates an additional embodiment of the present invention. In this embodiment, the reference numbers have been increased by 200 from like reference numbers in FIGS. 1–4 with like elements. FIG. 6 shows a segment of a round blank 206 that has side walls 215 disposed between two end walls 213, 214. Side walls 215 are perpendicular to the end walls 213, 214. The side walls 215 form hexagonal cells 216 which are bonded at both ends 217 to the end walls 213, 214. The end walls 213, 214 absorb radial forces that are applied to the roller. The compressive and tensile forces, which are acting axially, are absorbed by the side walls 215 and by the circumferential wall which, for the sake of clarity in this drawing figure, is not shown.

Figure 7:
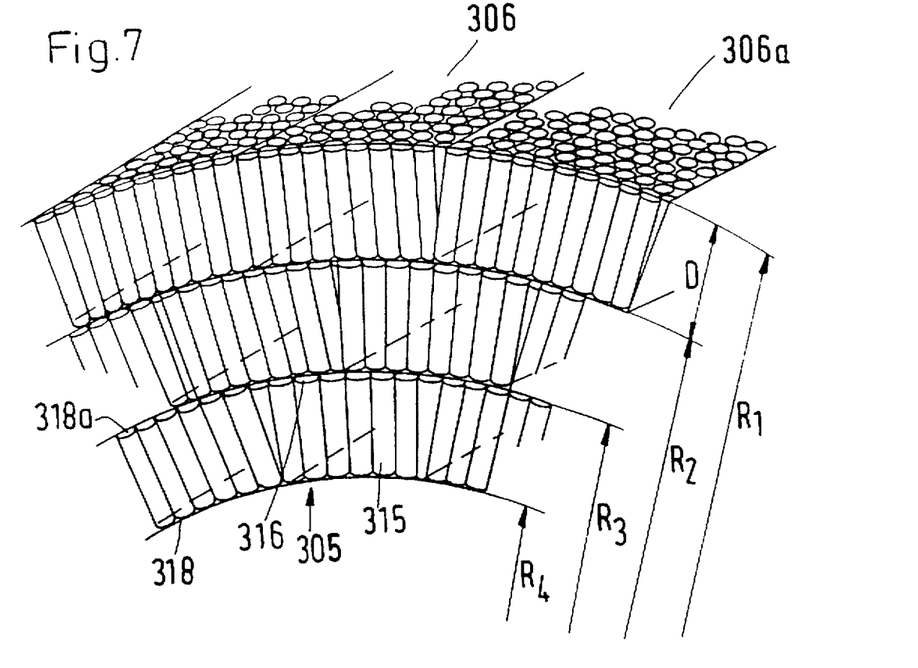
FIG. 7 is a partial cross-sectional perspective view of a support structure according to the present invention.
Figure 8:
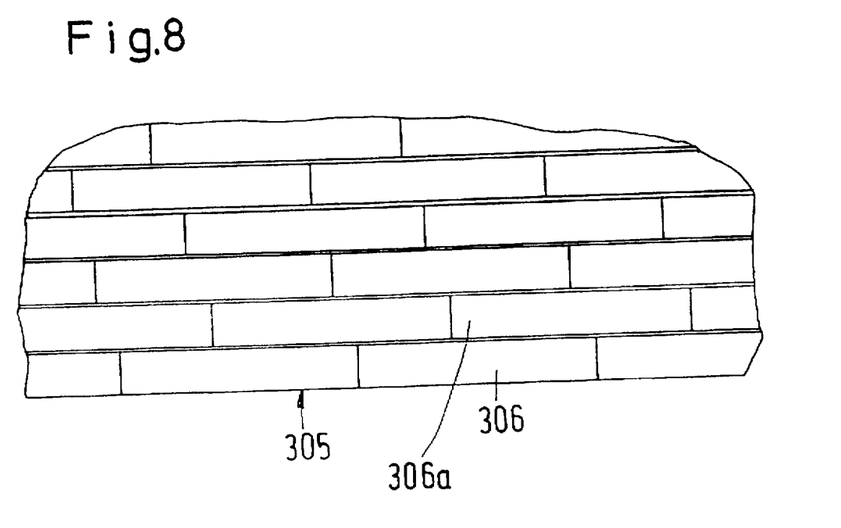
FIG. 8 is a partial exploded view of the circumference of the support structure illustrated in FIG. 7.

FIGS. 7 and 8 illustrate a further embodiment of the present invention, in which the reference numbers have been increased by 300 from like reference numbers in FIGS. 1–4 with like elements. The support structure 305 built up between the base body 302 and the circumferential wall 4 is comprised of individual elements 306. Elements 306 are preferably placed in four annular layers, one above the other, only three layers of which are shown in FIG. 7. In a preferred embodiment, each of the individual elements 306 has an axial length of 50 to 100 cm and extends for an angle of from 10° to 20° in the circumferential direction. Each individual element 306 has its side walls 315 of the individual cells 316 extending approximately radially. The ends of the cells 316 are covered by an inner cover wall 318 and an outer cover wall 318a. The cover walls are bonded in a fixed fashion with the adjacent cover wall of the layer that is located above or below it. Individual elements 306 and 306a, which are adjacent to one another in the circumferential direction, are offset with respect to each other in the axial direction (see FIG. 8).

By way of example, a calender roller of the embodiment illustrated in FIGS. 7 and 8 included a base body 2, which had an outside diameter of 500 mm. A flexible covering 3 had an inside diameter of 700 mm. A four layer support structure 5, with each layer having a thickness D=25 mm, was disposed between the base body 2 and the flexible covering 3. The outside radii of the layers, from outside to inside, was:

R1=350 mm;
R2=325 mm;
R3=300 mm; and
R4=275 mm.

Of course, the cover walls 318 and 318a were curved in accordance with the radii.

Figures 9, 10:
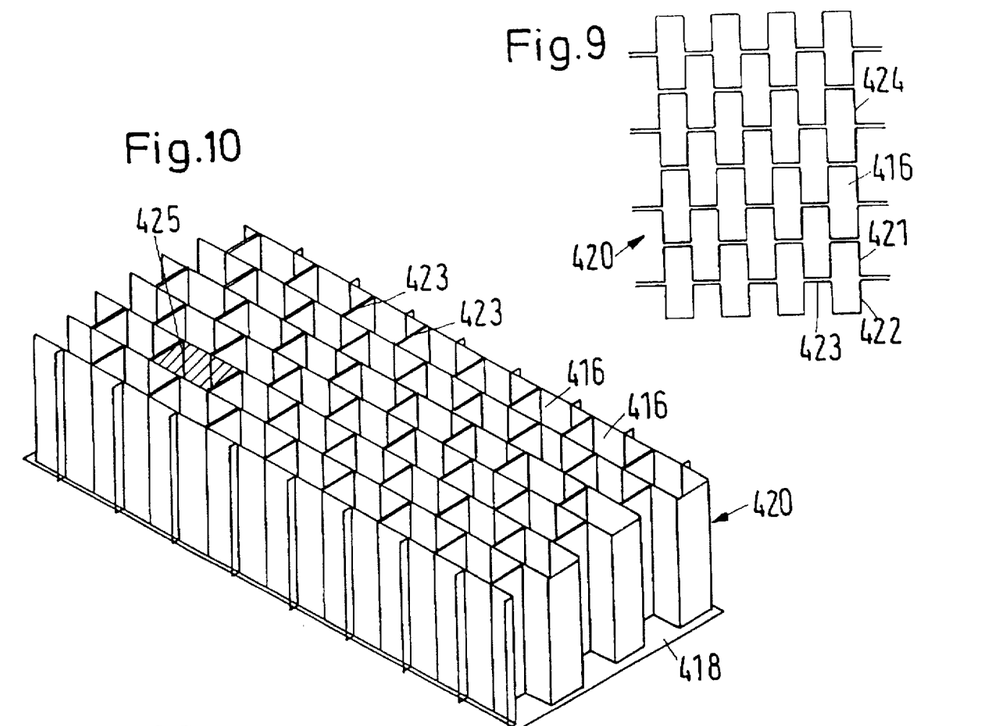
FIG. 9 schematically shows the structure of rectangular honeycombs.
FIG. 10 is a partial perspective view of a web of rectangular honeycomb material that is covered on one side.
Figure 11:
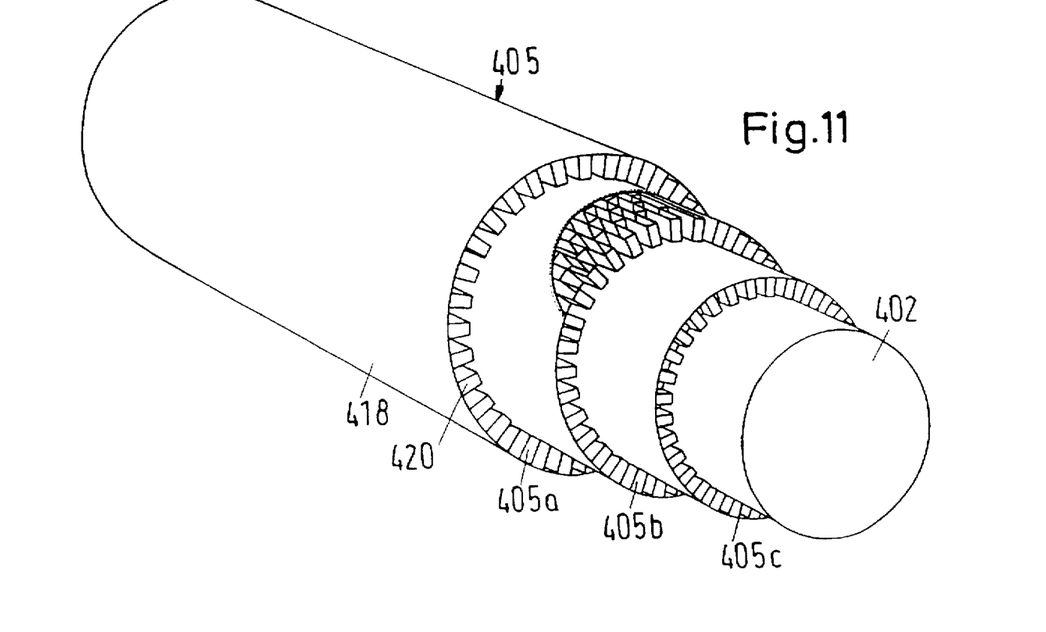
FIG. 11 is an exploded view of a base body, with parts broken away, showing three layers made from a web of rectangular honeycomb material in accordance with FIG. 10.

FIGS. 9–11 illustrate a further embodiment of the present invention, in which the reference numbers have been increased by 400 from like reference numbers in FIGS. 1–4 with like elements. A support structure 405, having three annular (i.e., cylindrical) layers 405a, 405b and 405c, is disposed about base body 402. Each annular layer is comprised of a cylindrically formed web of honeycomb material 420. A cover layer 418 is disposed on the exterior cylindrical surface of each layer 405a, 405b, 405c. The honeycombs or cells 416 have a rectangular cross-sectional shape and are, as is shown in FIG. 9, made from strips of fibrous material 421 and 422. Each strip is bent in a square-wave pattern. The portion of the strip walls that lie against each other, when the cells are formed, are preferably bonded together and form a double wall 423.

To manufacture a layer 405a, 405b, 405c, adhesive is placed on the strips of fibrous material 421 and 422 in a predetermined offset relationship with respect to each other so that the strips of fibrous material will be bonded together at the appropriate areas to form the double walls, which are illustrated in FIG. 9. The strips 421, 422 are then laid flat one upon the other. After the bonding has solidified, the strips of fibrous material are pulled apart, whereupon the strips automatically assume the shape illustrated in FIG. 9. The resulting web of honeycomb material 420 is then bonded to the cover layer 418. Thereafter, the combined web of honeycomb material 420 and cover layer 418 can be laid around the base body 402 or around a previously applied annular layer of the support structure 405 (for example, layer 405b will be placed on layer 405c). The outside diameter is determined by the cover layer 418. The support structure forms a cylindrical shape. In forming the cylindrical shape, the displacements of the individual cell walls 424 is determined by the structure immediately radially inside of the layer being formed. The radially outermost layer is preferably fixed to the immediately radially inwardly disposed structure by bonding.

As illustrated in FIG. 10, a honeycomb cell 416 is filled with a plastic 425. Plastic 425 is preferably a two component curable plastic resin, which is poured into cell 416 as a liquid and thereafter cures in place. This pouring and curing process preferably takes place before the next outer layer is placed on the roller and thereby covers the cells from the outside. Once all of the cells have been filled with filler material 425, an extraordinarily hard support structure 405 results. Of course, it is to be understood that layers 405a, 405b and 405c can be prefabricated and filled with the filler material before they are slipped over one another to form the support structure 405. It is to be further understood, that the cells of the other embodiments can also be filled with plastic in a similar fashion.

In a preferred embodiment, a plastic, such as an epoxy resin, which is reinforced with glass fibers or, more preferably, with carbon fibers, may be used for the cell material. The preferred ratio of fibers to plastic is 65 percent to 35 percent. Alternatively, the cellular material could be made of a fibrous material. The fibrous material is preferably an aramid, such as a para-aramid (e.g., KEVLAR™), or a meta-aramid (e.g., NOMEX™), both of which are sold by DuPont. The sheet material that is used as the starting material preferably consists of between 87 and 99 percent aramid fiber. Both materials have a relatively high resistance to heat for plastic. As a result, their physical properties are retained even under severe conditions.

Figure 12:
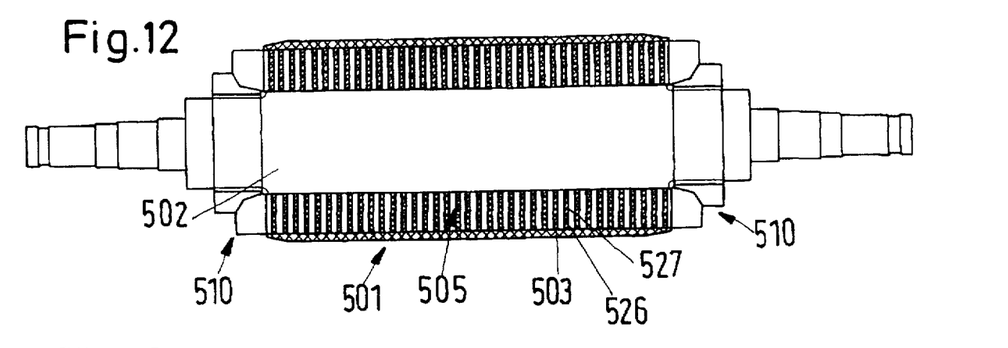
FIG. 12 is a partial cross-sectional view of an additional embodiment of a calender roller according to the present invention.
Figure 13:
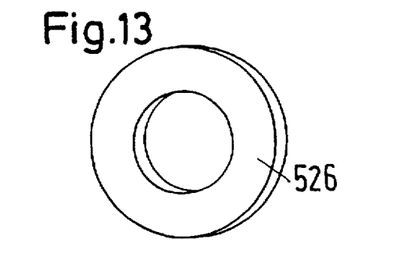
FIG. 13 is a perspective view of a round blank for use in a calender roller in accordance with FIG. 12.
Figure 14:
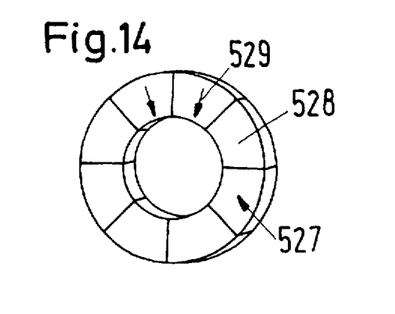
FIG. 14 is a perspective view of an additional round blank for use in a calender roller in accordance with FIG. 12.

FIGS. 12–14 illustrate a further embodiment of the present invention, in which reference numbers have been increased by 500 from like reference numbers in FIGS. 1–4 with like elements. A calender roller 501 includes a base body 502. A thinwall covering 503 is made of plastic and is slipped directly onto a support structure 505. Support structure 505 is comprised of alternately placed round blanks 526, 527. Blanks 526 are preferably made of a light weight metal, such as aluminum. Blanks 527 are preferably made of light weight wood, such as balsa wood. Round blanks 526, 527 are held in place by capping elements 510. The round wooden blanks 527 are assembled from eight arc-shaped segments 528, each of which has radially oriented fibers that are directed inwardly as indicated by arrows 529.

Figure 15:
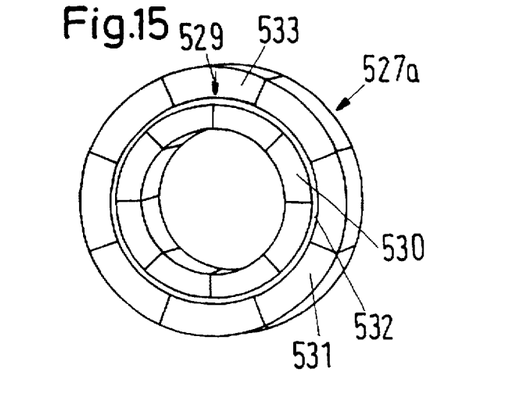
FIG. 15 is a perspective view of a modified round blank in accordance with FIG. 14.

FIG. 15 shows an alternative embodiment of a round wooden blank. Blank 527a includes two annular rings 530 and 531 which are bonded to each other along cylindrical seam 532. Rings 530, 531 are each preferably comprised of arc-shaped segments 533, which have radially oriented fibers 529 that are directed inwardly as indicated by arrows 529.

Figure 16:
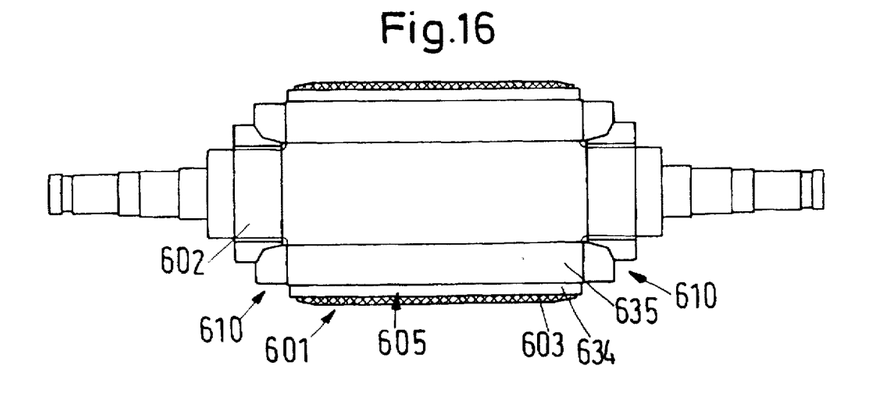
FIG. 16 is a partial cross-sectional view of an embodiment of a calender roller according to the present invention.

FIG. 16 illustrates a further embodiment of the present invention, in which reference numbers have been increased by 600 from like reference numbers in FIGS. 1–4 with like elements. A calender roller 601 includes a base body 602. A covering 603 is made of plastic and is slipped directly onto and bonded to a smooth outer tube 634. Tube 634 forms the outer circumference of a support structure 605. Support structure 605 is also comprised of a fibrous material covering 635. Fibrous material covering 635 is formed by a number of round blanks made of fibrous material which are layered onto each other and which are pressed together in the axial direction by capping elements 610. Covering 635 protrudes, in the radial direction, only slightly beyond the capping elements 610. Therefore, the overall diameter of the roller is no greater than a conventional roller that is made of a fibrous material. The outer surface of the covering can then be turned down until it has a smooth outer cylindrical surface. Therefore, the fibrous material covering 635 can be left on the base body 602 until it has been reduced to nearly the end of its turning-down reserve. In other words, covering 635 can be left on base body 602 until it can no longer be machined on a lathe to produce a smooth outer cylindrical surface. Tube 634 can thereafter be placed on covering 635 regardless of whether covering 603 has been applied to the tube.

Having described the presently preferred exemplary embodiment of a calender roller in accordance with the present invention, it is believed that other modifications, variations and changes will be suggested to those skilled in the art in view of the teachings set forth herein. For example, the round blanks of FIG. 12 can all be made from the same material (e.g., from either aluminum or wood). It is also possible to alternate round paper blanks with round aluminum blanks or round wooden blanks. The plastic covering 503 is preferably bonded or shrink fitted directly onto the support structure 505. Alternatively, an intermediate layer (i.e., a carrier layer) may be disposed between the plastic covering and the support structure to better distribute the loads. The capping elements are used to fix the support structure in place on the base body. Therefore, the capping elements can be eliminated if the support structure is fixed in place on the base body by other means, for example, by a press-fit or by bonding. It is, therefore, to be understood that all such modifications, variations, and changes are believed to fall within the scope of the present invention as defined by the appended claims.

What is claimed is:

1. A calender roller comprising:
   a cylindrical base body having an outside diameter, a first axial end and a second axial end;
   a covering made of a flexible plastic material having an inside diameter, said covering inside diameter being greater than said outside diameter of said base body so as to define an intermediate annular space therebetween;
   a hollow cylindrical support structure being disposed in said intermediate annular space, said support structure transmitting load forces from said covering to said base body substantially over its entire axial length; and
   a first capping element disposed adjacent to said first axial end of said base body, a second capping element disposed adjacent to said second axial end of said base body.

2. The calender roller according to claim 1, wherein a radial thickness of said support structure is about 30 to 100 percent of a radius of said base body.

3. The calender roller according to claim 2, wherein a specific gravity of said support structure is substantially less than a specific gravity of said base body.

4. The calender roller according to claim 3, wherein said specific gravity of said support structure is less than 3.5 kg/dm$^3$.

5. The calender roller according to claim 4, wherein said supporting structure is made from a thin wall material forming a plurality of cells.

6. The calender roller according to claim 5, wherein said cells are formed by a plurality of walls extending in a radial direction.

7. The calender roller according to claim 6, wherein said cells are closed on at least one end by a cover wall.

8. The calender roller according to claim 7, wherein said support structure includes a plurality of elements, said plurality of elements being fixedly connected together.

9. The calender roller according to claim 8, wherein each of said elements is comprised of a round blank, each of said cells being disposed between a pair of end walls which extend in a radial plane.

10. The calender roller according to claim 9, wherein said cells disposed in each of said elements extend parallel to the direction that said pair of end walls extend, wherein adjacent first and second round blanks are connected together such that said cells of said first round blank extend at an angle offset with respect to said cells of said second round blank.

11. The calender roller according to claim 9, wherein said plurality of side walls extend substantially perpendicularly with respect to said pair of end walls.

12. The calender roller according to claim 7, wherein said plurality of elements are disposed in at least one annular layer, adjacent ones of said elements in said layer being offset in the axial direction.

13. The calender roller according to claim 9, wherein said support structure is formed by at least one annular layer, said cells having a honeycomb shape.

14. The calender roller according to claim 13, wherein said cells have a cylindrical cover layer disposed on at least one end thereof.

15. The calender roller according to claim 5, wherein said cells have a rectangular honeycomb-like shape.

16. The calender roller according to claim 5, wherein said cells have a corrugated shape.

17. The calender roller according to claims 14, wherein said cells are made of a fiber-reinforced plastic.

18. The calender roller according to claim 5, wherein said cells are made of a fibrous material.

19. The calender roller according to claim 18, wherein said fibrous material is an aramid.

20. The calender roller according to claim 5, wherein said cells are filled with a curable filler material.

21. The calender roller according to claim 20, wherein said filler material is a curable plastic.

22. The calender roller according to claim 3, wherein said support structure is made of, at least in part, light weight metals.

23. The calender roller according to claim 22, wherein said support structure is made of, at least in part, wood.

24. The calender roller according to claim 23, wherein said wood is balsa wood.

25. The calender roller according to claim 24, wherein said support structure is made of, at least in part, a fibrous material.

26. The calender roller according to claim 25, wherein said support structure includes a plurality of round blanks made of at least one of wood, light weight metal, fibrous material and cellular material.

27. The calender roller according to claim 26, wherein said round blanks are disposed on said base body so that adjacent round blanks are made of different material.

28. The calender roller according to claim 27, wherein said round blanks are made of aluminum and cellular material.

29. The calender roller according to claim 26, wherein said round blanks are made of wood and are divided into a plurality of arc segments, said wood having a plurality of fibers that are aligned radially.

30. The calender roller according to claim 29, wherein said round wooden blanks include at least two rings.

31. The calender roller according to claim 25, wherein said support structure is configured so that it may be machined on a lathe.

32. The calender roller according to claim 31, wherein said support structure has a thin wall continuous tube disposed about said portion of said support structure made from said fibrous material.

33. The calender roller according to claim 1, wherein said support structure includes a plurality of aluminum disks.

* * * * *